(12) United States Patent
Robotham et al.

(10) Patent No.: US 10,917,954 B2
(45) Date of Patent: Feb. 9, 2021

(54) SINGLE STAGE CURRENT CONTROLLER FOR A NOTIFICATION APPLIANCE

(71) Applicant: Carrier Corporation, Palm Beach Gardens, FL (US)

(72) Inventors: Martin Paul Robotham, Palm Beach Gardens, FL (US); Levent Taspek, Palm Beach Gardens, FL (US)

(73) Assignee: Carrier Corporation, Palm Beach Gardens, FL (US)

( * ) Notice: Subject to any disclaimer, the term of this patent is extended or adjusted under 35 U.S.C. 154(b) by 0 days.

(21) Appl. No.: 16/299,338

(22) Filed: Mar. 12, 2019

(65) Prior Publication Data
US 2019/0289691 A1 Sep. 19, 2019

Related U.S. Application Data

(60) Provisional application No. 62/643,789, filed on Mar. 16, 2018, provisional application No. 62/608,930, (Continued)

(51) Int. Cl.
| | |
|---|---|
| *H05B 47/10* | (2020.01) |
| *G08B 5/36* | (2006.01) |
| *H02J 7/00* | (2006.01) |
| *G08B 25/04* | (2006.01) |
| *G08B 5/38* | (2006.01) |

(Continued)

(52) U.S. Cl.
CPC .............. *H05B 47/10* (2020.01); *G08B 5/36* (2013.01); *G08B 5/38* (2013.01); *G08B 25/04* (2013.01); *G08B 25/045* (2013.01); *G08B 29/126* (2013.01); *H02J 7/0068* (2013.01); *H02J 7/0072* (2013.01); *H02J 7/345* (2013.01)

(58) Field of Classification Search
CPC ... H05B 37/0209; H05B 47/10; H02J 7/0072; H02J 7/0068; H02J 7/345; G08B 5/36
See application file for complete search history.

(56) References Cited

U.S. PATENT DOCUMENTS

| | | | |
|---|---|---|---|
| 6,487,098 B2 | 11/2002 | Malik et al. | |
| 7,777,424 B2 | 8/2010 | Hebborn | |

(Continued)

FOREIGN PATENT DOCUMENTS

| | | |
|---|---|---|
| CN | 101102077 | 1/2008 |
| CN | 102333405 | 1/2012 |

(Continued)

OTHER PUBLICATIONS

Chester Simpson, Linear and Switching Voltage Regulator Fundamental Part 1, 2011, Texas Instruments, p. 2 (Year: 2011).*

(Continued)

*Primary Examiner* — Raymond R Chai
(74) *Attorney, Agent, or Firm* — Carlson, Gaskey & Olds, P.C.

(57) ABSTRACT

A notification appliance circuit includes at least one notification appliance. The at least one notification appliance includes a charge controller including a single stage current controller, the charge controller being configured to output a charge current, an energy store configured to receive the charge current, and provide a discharge current, and a notification component configured to receive the discharge current and emit a notification.

12 Claims, 4 Drawing Sheets

Related U.S. Application Data filed on Dec. 21, 2017, provisional application No. 62/618,276, filed on Jan. 17, 2018.

(51) Int. Cl.
*G08B 29/12* (2006.01)
*H02J 7/34* (2006.01)

(56) References Cited

U.S. PATENT DOCUMENTS

| | | | |
|---|---|---|---|
| 8,760,301 B2 | 6/2014 | Savage, Jr. | |
| 9,087,441 B2 | 7/2015 | Gadonniex et al. | |
| 9,345,082 B2 | 5/2016 | Savage, Jr. | |
| 9,491,822 B2 | 11/2016 | Wu et al. | |
| 2005/0219060 A1* | 10/2005 | Curran | G08B 5/38 340/815.45 |
| 2007/0188139 A1* | 8/2007 | Hussain | H02J 7/007 320/128 |
| 2011/0248640 A1* | 10/2011 | Welten | H05B 45/10 315/210 |
| 2013/0175936 A1* | 7/2013 | Chen | H05B 45/395 315/200 R |
| 2013/0193865 A1 | 8/2013 | Keller et al. | |
| 2016/0071402 A1 | 3/2016 | Chiarizio et al. | |
| 2016/0218613 A1 | 7/2016 | Hussien et al. | |
| 2017/0303354 A1 | 10/2017 | Yau | |

FOREIGN PATENT DOCUMENTS

| | | |
|---|---|---|
| CN | 103987178 | 8/2014 |
| CN | 104080250 | 10/2014 |
| CN | 205430721 | 8/2016 |
| EP | 2899704 | 7/2015 |
| EP | 3151208 | 4/2017 |
| EP | 2345309 | 11/2017 |
| WO | 2013191814 | 12/2013 |

OTHER PUBLICATIONS

Partial European Search Report for Application No. 19161379.3 dated Jun. 18, 2019.

* cited by examiner

SINGLE STAGE CURRENT CONTROLLER FOR A NOTIFICATION APPLIANCE

CROSS-REFERENCE TO RELATED APPLICATIONS

This application claims priority to U.S. Provisional Application No. 62/643,789 filed on Mar. 16, 2018 which claims priority to both U.S. Provisional Application No. 62/608,930 filed on Dec. 21, 2017 and U.S. Provisional Application No. 62/618,276 filed Jan. 17, 2018.

TECHNICAL FIELD

The present disclosure relates generally to current controllers for notification systems, and more specifically to a single stage current controller for the same.

BACKGROUND

Fire alarm and mass notification systems are used to notify the public of the presence of fire, smoke and other potentially harmful conditions. A notification appliance circuit (NAC) may be part of such a system and include many notification devices powered and controlled by a common power source and control panel.

A notification appliance for providing audio and/or visual notifications to draw attention to an incident and/or an announcement, such as a strobe based, horn based, or combination of strobe and horn based notification system (depending on the components of the notification appliance), may be utilized as part of a NAC and is a warning device with a light engine, an energy store and a flash control. Strobes that are part of a NAC are required to flash in a synchronized manner. The strobe notification appliance provides a brief intense flash of light at predetermined intervals. The brief intense flash from many different strobes requires more power than is practically provided over the circuit.

Key performance metrics for a notification strobe are cost, current-draw and reliability. With regards to the current-draw metric, two current components must be used over the course of operations. First is the initial current draw when the strobe begins operating, and the second is the normal operational draw as the strobe maintains operations. The continuous draw is referred to herein as the operating draw of the notification appliance. Existing systems addressed the varied current requirements of the initial current draw and the operating draw by utilizing a current controller having multiple distinct hardware stages, with each hardware stage providing the current for a different current draw component.

Utilization of multiple stages within a circuit increases the physical component count, the required surface area of the circuit board, the cost, and the complexity of the current controller. Further, switching losses involved in operating switch mode converters can dominate the efficiency of the current controller while operating at low voltages.

SUMMARY OF THE INVENTION

In one exemplary embodiment a notification appliance circuit includes at least one notification appliance. The at least one notification appliance includes a charge controller including a single stage current controller, the charge controller being configured to output a charge current, an energy store configured to receive the charge current, and provide a discharge current, and a notification component configured to receive the discharge current and emit a notification.

In another example of the above described notification appliance circuit the charge controller further includes a processor configured to provide the single stage current controller with a charge current control signal and an enable signal.

In another example of any of the above described notification appliance circuits the processor includes a memory storing instructions configured to cause the processor to perform an adaptable optimized charging method.

In another example of any of the above described notification appliance circuits a charge level output of the energy store is connected to the processor.

In another example of any of the above described notification appliance circuits the single stage current controller includes a current sensor configured to sense an input current of the current controller, a transconductance element configured to output a charge current based on a magnitude of a received transconductance control signal, and a main circuit configured to produce the transconductance control signal based at least in part on a sensed current value received from the current sensor, a charge current control input, and an enable input.

In another example of any of the above described notification appliance circuits the transconductance element includes a MOSFET.

In another example of any of the above described notification appliance circuits the sensed current value and the charge control current value are connected to a summation circuit configured to add the sensed current value and the charge control value.

In another example of any of the above described notification appliance circuits at least one of the sensed current value and the charge control current value is connected to the summation circuit via one of a first gain circuit and a second gain circuit.

In another example of any of the above described notification appliance circuits the sensed current value is connected to the summation circuit via a first gain circuit and the charge control current value is connected to the summation circuit via a second gain circuit.

In another example of any of the above described notification appliance circuits the enable input is connected to a bias generator, and the bias generator is configured to generate a bias voltage based on the enable input.

In another example of any of the above described notification appliance circuits an output of the summation circuit is connected to a summer, an output of the bias generator is connected to the summer, and the summer is configured to subtract the output of the summation circuit from the output of the bias generator.

In another example of any of the above described notification appliance circuits an output of the summer is connected to an input of the transconductance element.

In another example of any of the above described notification appliance circuits the charge controller is programmable.

An exemplary method for controlling a charge current of a notification appliance includes receiving an input current at a single stage current controller, and outputting a charge current from the single stage current controller during at least two operational modes of the notification appliance.

In another example of the above described method for controlling a charge current of a notification appliance the at least two operational modes include an operating draw mode and an initial current draw mode.

In another example of any of the above described methods for controlling a charge current of a notification appliance outputting the charge current from the single stage current controller comprises providing a voltage input to a transconductance element, and generating a current output from the transconductance element, wherein the current output is the charge current.

Another example of any of the above described methods for controlling a charge current of a notification appliance further includes determining the voltage input based at least in part on a sensed input current of the single stage current controller, and a charge current control signal output from a processor and an enable signal output from the processor.

Another example of any of the above described methods for controlling a charge current of a notification appliance further includes multiplying at least one of the charge current control signal and the sensed input current by a gain value, thereby ensuring that the charge current control signal and the sensed input current are at a correct scale.

Another example of any of the above described methods for controlling a charge current of a notification appliance further includes summing the sensed input current and the charge current control signal to create a summed value, generating a bias voltage based on the enable signal, and subtracting the summed value from the bias voltage and thereby generating a transconductance element control signal.

In another example of any of the above described methods for controlling a charge current of a notification appliance outputting a charge current from the single stage controller comprises outputting a charge current from a transconductance element.

These and other features of the present invention can be best understood from the following specification and drawings, the following of which is a brief description.

DETAILED DESCRIPTION OF AN EMBODIMENT

Figure 1:
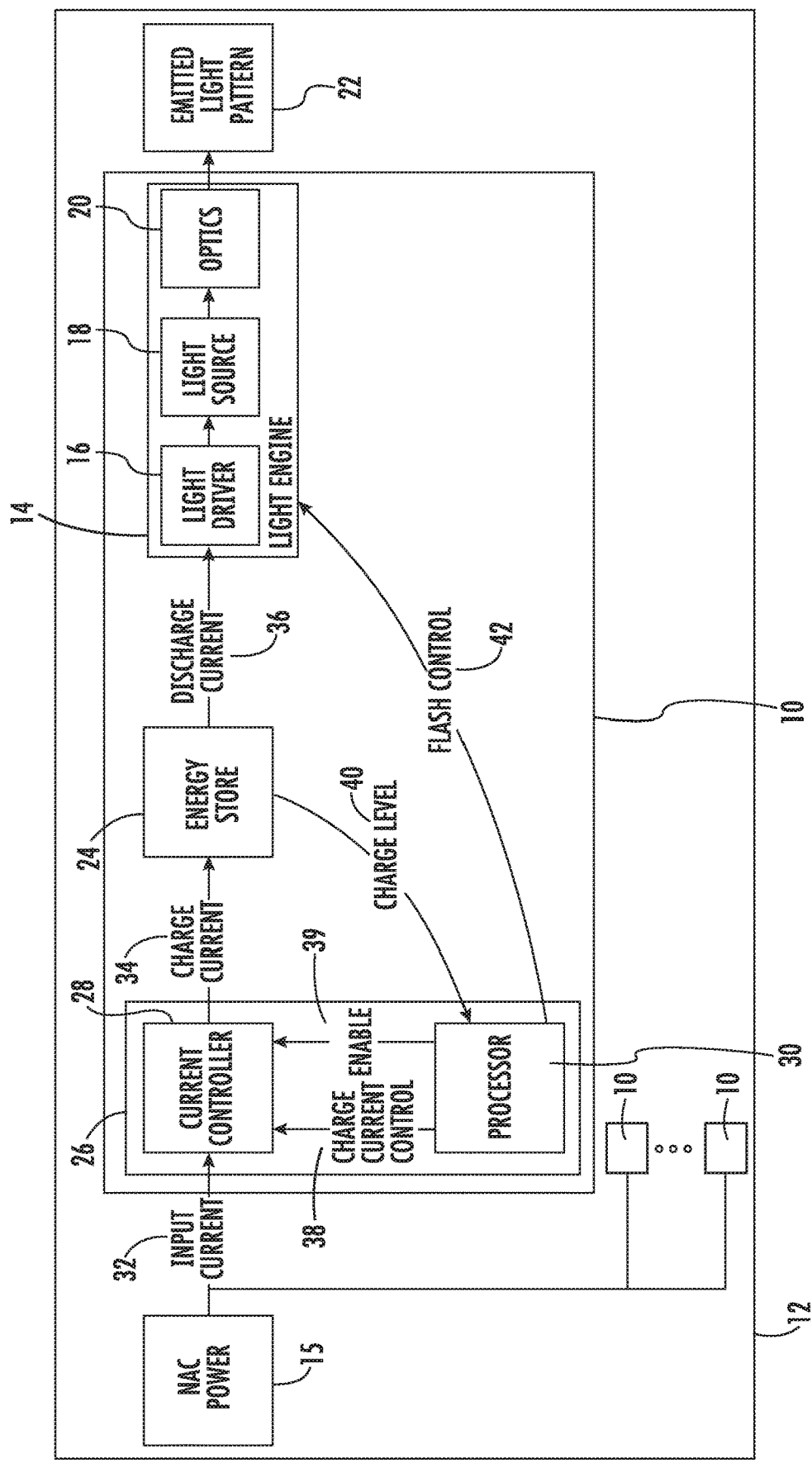
FIG. 1 is a block diagram of an example notification appliance circuit.
Figure 2:
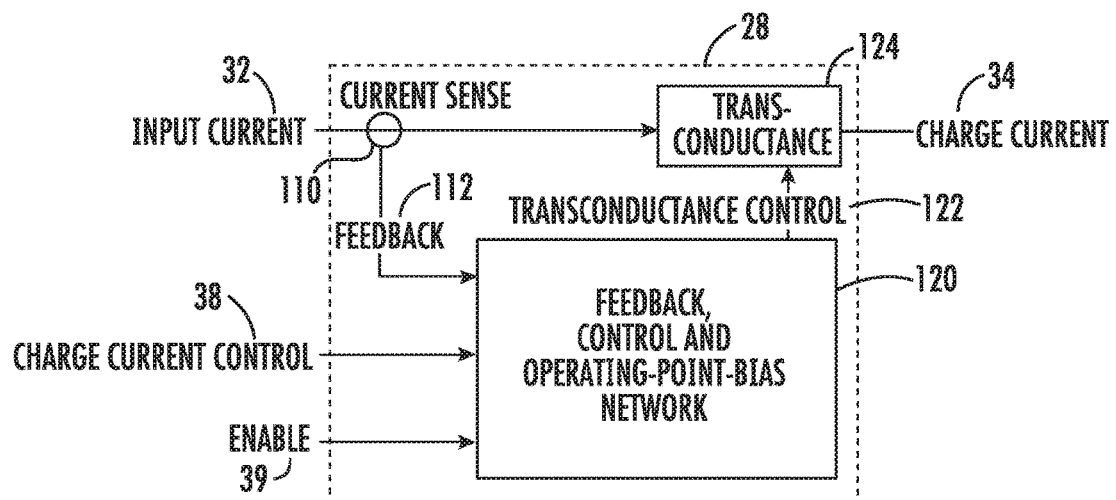
FIGS. 2-4 illustrate an exemplary current controller for utilization in the notification appliance circuit of FIG. 1 in sequentially greater detail.
Figure 3:
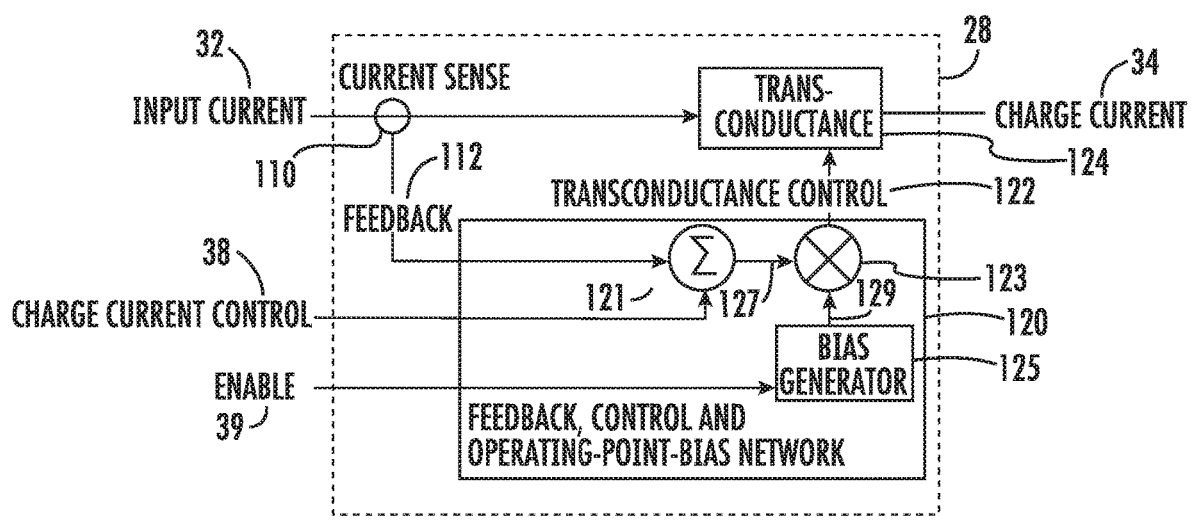
Figure 4:
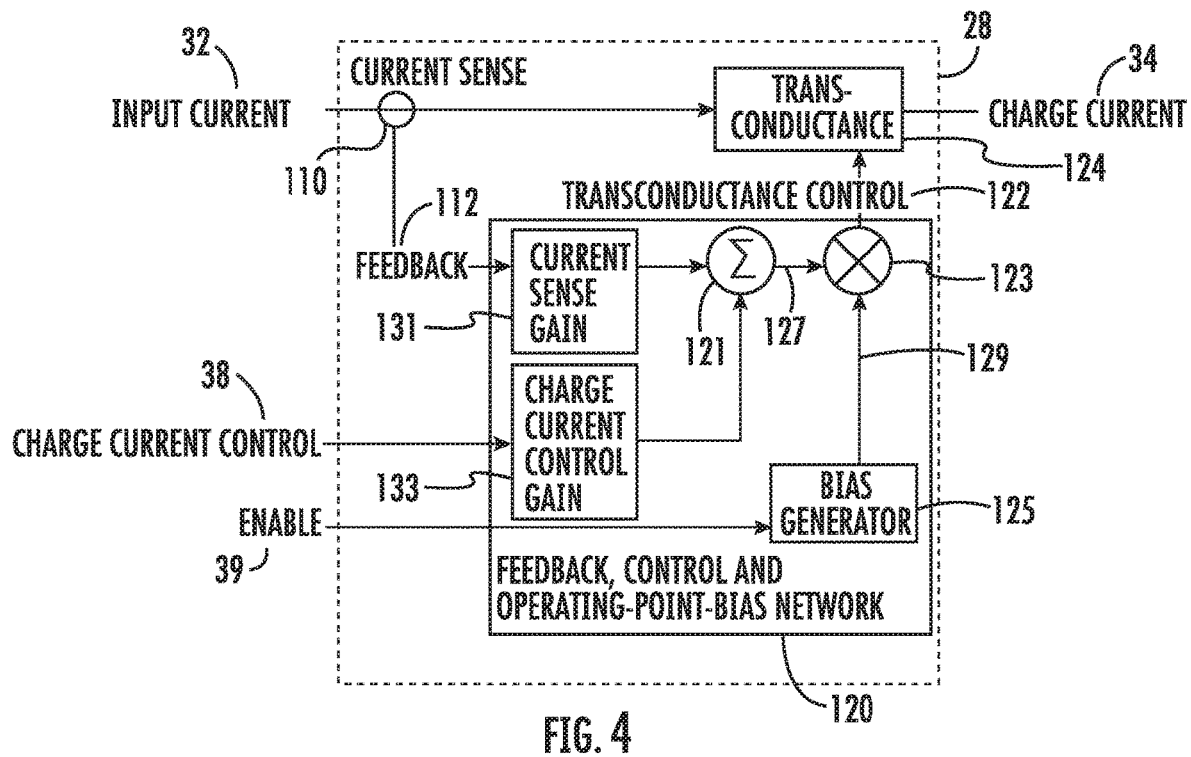

Referring to FIG. 1, an example notification appliance 10 includes a light engine 14 that generates a brief, intense flash of light at a predetermined interval. The example notification appliance 10 is one of many notification appliances 10 that are part of a notification appliance circuit (NAC) schematically shown at 12. Each of the notification appliances 10 that are part of the NAC 12 are required to flash at the same time. However, it is not practical for all of the appliances 10 to draw the amount of power required for a flash from the NAC power input 15 during the short time duration of each flash. Accordingly, each notification appliance 10 includes an energy store 24 that buffers energy from the NAC power input 15 for the light engine 14. Energy store 24 may include a super-capacitor, a capacitor or a battery, and/or any other form of energy storage.

A charge controller 26 includes a single stage current controller 28 and a processor 30. The processor 30 controls flash timing for the flash. The processor 30 may be a processing chip, a microcontroller, a microprocessor, or a combination of any of these and is not limited to any particular processor configuration. The charging current 34 is adjusted by the processor 30 that is part of the charge controller 26. In order to control charge of the energy store 24, the processor 30 provides current control using charge current control 38 and an enable signal 39 connected to the single stage current controller 28. The processor 30 includes a method that controls the charging current 34 which charges the energy store 24. The method can be an adaptable optimized charging method, as described in U.S. Provisional Patent Application No. 62/618,276 which is herein incorporated by reference. Alternatively, any other method that may be known in the art could be utilized in place of the adaptable optimized charging method depending on the needs of a specific implementation.

The energy store 24 is used to convert a long duration low power charge from input current 32 provided by the NAC power input 15 into the high power short duration energy discharge utilized by a notification component such as the light engine 14. The energy store 24 is charged with a charging current 34 to generate the discharge current 36 to the notification component, in this case the light engine 14. The charging current 34 must charge the energy store 24 up to a fully charged level within a predetermined interval at which the light engine 14 operates. The energy store 24 is charged from a low charge level to a fully charged level required to power the light engine 14 and then recharged within the predefined interval of flashes for the next flash. In order to facilitate these operations, a charge level 40 of the energy stored is determined using any conventional charge level detection means and is provided to the processor 30.

During the discharge period of the predefined interval, the light engine 14 takes power from the energy store 24 and uses a light driver 16 to convert that power into a form usable by a light source 18. The light source 18 generates light conditioned through optics 20 to emit a desired light pattern 22.

The example charge controller 26 includes a processor 30 which includes a control method that adjusts the charging current 34 such that the charge level 40 of the energy store 24 is recharged to a full charge level required to generate the light flashes at a minimum output level and within a time that corresponds with the predetermined interval. The charging can be performed according to the adaptable optimized charging method in some examples, as described in U.S. Provisional Patent Application No. 62/618,276. In alternative examples, the charging can be performed using any alternative charge method that may be known in the art.

In order to reduce the physical component count, reduce the size of each of the notification appliances 10 within the NAC 12, and reduce the complexity of the single stage current controller 28, a single stage current controller 28 is utilized to provide the charge current 34 for both the operating draw and the initial draw of the energy store 24. The single stage current controller 28 replaces the inrush limiter, inrush bypass and current regulator systems of previous multi-stage current controllers. Further, in some examples, the single stage current controller 28 is programmable and capable of being programmed to output a substantial range of current values, depending on the analog voltage of the charge current control 38 input received from the processor 30.

In some examples, the single stage current controller 28 is a linear current controller, with the output current being linearly dependent upon the charge current control input 38.

In such examples, the single stage current controller 28 has a lower rated current than existing switch-mode (multi-stage) current controllers across the rated voltage range of the single stage current controller 28.

The flexible current output design of the single stage current controller 28 allows the initial current draw for any given operation to be sculpted to the desired output rating. In yet further examples, the single stage current controller 28 can be utilized in conjunction with an optimized adaptive charging method, performed by the processor 30, that continuously tunes the current output by the single stage current controller 28 to provide for optimized performance of the notification appliance 10.

With continued reference to FIG. 1, FIGS. 2-4 illustrate an exemplary single stage current controller 28 for utilization in the notification appliance 10 of FIG. 1 in sequentially greater detail. At the most general level, illustrated in FIG. 2, the single stage current controller 28 includes a current sensor 110 that senses the input current 32, and provides the sensed input current 32 to a main circuit 120 via a feedback signal 112. The main circuit 120 can, alternatively, be referred to as a feedback control and operating-point-bias network because it is a circuit that biases the transconductance element 124 into conduction, and implements feedback control to hold the charge current at a level commanded by the charge current control signal despite perturbations away from nominal component values caused by tolerance or thermal effects.

The main circuit 120 also receives the charge current control signal 38, and the enable signal 39, and converts the three received signals 38, 39, 112 into a transconductance control signal 122. The transconductance control signal 122 is output to a transconductance element 124 which controls the magnitude of the charging current 34 output from the single stage current controller 28.

Figure 5:
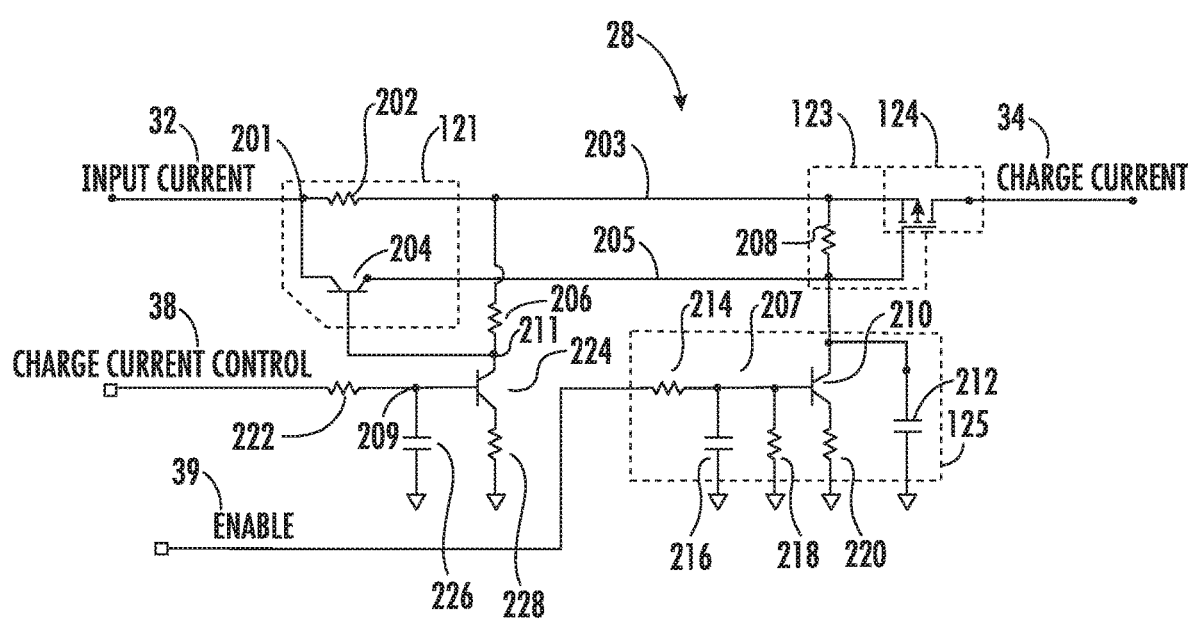
FIG. 5 schematically illustrates an exemplary circuit diagram of an exemplary current controller for the notification appliance circuit of FIG. 1.

Transconductance is the electrical characteristic relating the current through the output of a device to the voltage across the input of the device, and can alternately be referred to as mutual conductance. The transconductance control signal 122 provides a voltage to an input of the transconductance element 124, with the magnitude of the voltage controlling the output current (the charging current 34) of the transconductance element 124. In one exemplary embodiment, illustrated in FIG. 5, the transconductance element 124 comprises a MOSFET transistor. In alternative embodiments, any alternative transconductance element 124, or an arrangement of transconductance elements, can be utilized to the same effect.

Although biasing may not be required of an ideal transconductance element, biasing is a requirement of a real-world MOSFET. A MOFET sets the gate-source-voltage (Vgs) above its threshold (Vgs–th), to allow current flow between the source and drain. Biasing to the operating point is an attempt to set the MOSFET towards a linear region of the Vgs/Id curve. Feedback is used to overcome non-linearity in component characteristics (as occurs with production tolerance between components, and within an individual component as ambient and self-heating temperature change).

Within the main circuit 120, a summation block 121 combines the feedback signal 112 from the current sensor 110 with the charge current control signal 38, and provides the control signal 127 to a summer 123. Simultaneously, the enable signal 39 is provided to a bias generator 125 that creates a bias signal 129 based on the enable signal 39. The bias signal 129 and the control signal 127 are combined in the summer 123, with the control signal 127 being subtracted from the bias signal 129, to form the transconductance control signal 122. The transconductance control signal 122 is provided to the transconductance element 124, and controls the output charging current 34.

Also included between the current sensor 110 and the summation block 121 is a current sense gain 131. Positioned between the charge current control signal 38 and the summation block 121 is a charge current control gain 133. The gains 131, 133 multiplicatively adjust the sensor signal 112 and the charge current control signal 38 to match the output characteristics of their respective preceding stages with the input characteristics of the summation block 121. The correct gain for any given main circuit 120 will depend on the application, and the actual components of the main circuit and can be determined using any known conventional means.

Gain is a requirement of real-world components in order to match the output characteristics of the previous stage with the input characteristics of the next stage. In an exemplary embodiment, the processor 30 may output Charge Current Control signal 38 by using a digital-to-analog converter (DAC) output with a range on the order of 0 to 3V and the summation block 121 may have an input range on the order of 0 to 1.0V, then a matching gain of 1.0/3.0≈0.3 could be used between the stages. Thus the equation (voltage of Charge Current Control)*(Charge current control gain) =summation block input, or [0 to 3.0V]*1.0/3.0=[0 to 1.0V]; therefore, the range of outputs which the processor 30 may produce for the charge current control, 0 to 3.0V, will be expressed for the range of inputs the summation block is configured to accept, in this case, 0 to 1.0V. Thus, the scale required for adjustment of the current, e.g. the required gain between the charge current control 38 and the summation block 121 may be determined from the output characteristics (e.g. voltage range) of the charge current control 38 and the input characteristics of the summation block 121. Similarly, if the output range of the charge current control 38 is similar to the input characteristics of the summation block 121, no gain will be required.

With continued reference to FIGS. 1-4, FIG. 5 schematically illustrates a circuit diagram of an exemplary single stage current controller 28 for implementing the notification appliance 10 of FIGS. 1-4. It is appreciated that alternative topologies for implementing the block diagrams of FIG. 1-4 could be utilized to similar effect and still fall within the purview of this disclosure.

The exemplary single stage current controller 28, receives the input current 32 at a first node 201. The first node 201 is connected to a first end of a first resistor 202 and a first transistor 204. The second end of the resistor 202 connects to a second node 203. Also connected to the second node 203 are a second resistor 206, a third resistor 208, and the input of the transconductance element 124. The third resistor 208 connects the second node 203 to a third node 205. The third node 205 is also connected to the second end of the first transistor 204, another input of the transconductance element 124, an input to a second transistor 210, and a first capacitor 212. A control input for the first transistor 204 is connected to a sixth node 211 and the sixth node 211 connects a third transistor 224 to the second resistor 206.

The enable signal 39 is input to a fourth resistor 214, which is connected to a fourth node 207. A second capacitor 216 and a fifth resistor 218 each connect the fourth node to ground (neutral). The output of the second transistor 210 is also connected to ground via a sixth resistor 220.

The charge current signal 38 is received at a seventh resistor 222. The seventh resistor 222 is connected at the opposite end to a fifth node 209. The fifth node 209 is connected to a control input of a third transistor 224, and is connected to ground via a third capacitor 226. The output of the third transistor 224 is connected to ground via an eighth resistor 228.

As described above, the single stage current controller 28 utilizes only a single stage of electronics to achieve the desired charge current in all operating modes. Further, while the specific topology illustrated in FIG. 5 can be used to achieve the system, it is understood that the system is not limited to the exact topology described.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A notification appliance circuit comprising:
at least one notification appliance, the at least one notification appliance including
a charge controller including a single stage current controller, the charge controller being configured to output a charge current, wherein the single stage current controller includes a transconductance element configured to output the charge current based on a magnitude of a received transconductance control signal and the charge current is linearly dependent on the magnitude of the received transconductance element control signal in the single stage current controller;
an energy store configured to receive the charge current, and provide a discharge current;
a notification component configured to receive the discharge current and emit a notification;
wherein the single stage current controller includes a current sensor configured to sense an input current of the current controller, and a main circuit configured to produce the received transconductance control signal based at least in part on a sensed current value received from the current sensor, a charge current control input, and an enable input; and
wherein the sensed current value and a charge control current value of the charge current control input are provided to a summation circuit, the summation circuit being configured to add the sensed current value and the charge control value of the charge current control input.

2. The notification appliance circuit of claim 1, wherein the charge controller further includes a processor configured to provide the single stage current controller with a charge current control signal and an enable signal.

3. The notification appliance of claim 2, wherein the processor includes a memory storing instructions configured to cause the processor to perform an adaptable charging method.

4. The notification appliance circuit of claim 2, wherein a charge level output of the energy store is connected to the processor.

5. The notification appliance circuit of claim 1, wherein the single stage current controller includes a current sensor configured to sense an input current of the current controller, and a main circuit configured to produce the received transconductance control signal based at least in part on a sensed current value received from the current sensor, a charge current control input, and an enable input.

6. The notification appliance circuit of claim 5, wherein the transconductance element includes a MOSFET.

7. The notification appliance circuit of claim 1, wherein at least one of the sensed current value and the charge control current value of the charge current control input is provided to the summation circuit via one of a first gain circuit and a second gain circuit.

8. The notification appliance circuit of claim 7, wherein the sensed current value is provided to the summation circuit via the first gain circuit and the charge control current value of the charge current control input is connected to the summation circuit via the second gain circuit.

9. The notification appliance circuit of claim 1, wherein the enable input is connected to a bias generator, and the bias generator is configured to generate a bias voltage based on the enable input.

10. The notification appliance circuit of claim 9, wherein an output of the summation circuit is connected to a summer, an output of the bias generator is connected to the summer, and the summer is configured to subtract the output of the summation circuit from the output of the bias generator.

11. The notification appliance of claim 10, wherein an output of the summer is connected to an input of the transconductance element.

12. The notification appliance of claim 1, wherein the charge controller is programmable.

* * * * *